(12) United States Patent
Yoshinaga et al.

(10) Patent No.: US 11,021,593 B2
(45) Date of Patent: Jun. 1, 2021

(54) RUBBER COMPOSITION FOR ADDITIVE MANUFACTURING

(71) Applicant: SUMITOMO RUBBER INDUSTRIES LTD., Kobe (JP)

(72) Inventors: Hisao Yoshinaga, Kobe (JP); Takuro Akasaka, Kobe (JP); Yoshikazu Masuyama, Kobe (JP); Nami Masao, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 201 days.

(21) Appl. No.: 16/080,603

(22) PCT Filed: Jan. 11, 2017

(86) PCT No.: PCT/JP2017/000649
§ 371 (c)(1),
(2) Date: Aug. 28, 2018

(87) PCT Pub. No.: WO2017/154335
PCT Pub. Date: Sep. 14, 2017

(65) Prior Publication Data
US 2019/0010311 A1  Jan. 10, 2019

(30) Foreign Application Priority Data
Mar. 7, 2016 (JP) .............................. JP2016-042996

(51) Int. Cl.
*C08L 7/00* (2006.01)
*B33Y 70/00* (2020.01)
(Continued)

(52) U.S. Cl.
CPC ................ *C08L 7/00* (2013.01); *B29C 64/00* (2017.08); *B29C 64/106* (2017.08); *B29C 67/00* (2013.01);
(Continued)

(58) Field of Classification Search
CPC ... C08L 7/00; C08L 9/00; C08L 21/00; B33Y 70/00; B33Y 10/00; B29C 64/00;
(Continued)

(56) References Cited
U.S. PATENT DOCUMENTS

2002/0132872 A1  9/2002  Yamamura et al.
2005/0171255 A1  8/2005  Yamamura et al.
(Continued)

FOREIGN PATENT DOCUMENTS

CN  101605830 A  12/2009
CN  104761761 A   7/2015
(Continued)

OTHER PUBLICATIONS

Extended European Search Report dated Oct. 23, 2019, for counterpart European Application No. 17762682.7.
(Continued)

*Primary Examiner* — William K Cheung
(74) *Attorney, Agent, or Firm* — Birch, Stewart, Kolasch & Birch, LLP (57) ABSTRACT

There is provided a rubber composition for additive manufacturing that allows rubber shaped articles to be favorably produced using an additive manufacturing apparatus. The rubber composition for additive manufacturing of the present invention comprises a liquid rubber.

16 Claims, 2 Drawing Sheets

(a)

(b)

(51) Int. Cl.
*B29C 67/00* (2017.01)
*C08L 9/00* (2006.01)
*B29C 64/00* (2017.01)
*C08L 21/00* (2006.01)
*B29C 64/106* (2017.01)
*B33Y 10/00* (2015.01)
*B29K 19/00* (2006.01)
*B29K 105/00* (2006.01)
*B29K 105/24* (2006.01)
*B29K 509/08* (2006.01)

(52) U.S. Cl.
CPC ............ *B33Y 70/00* (2014.12); *C08L 9/00* (2013.01); *C08L 21/00* (2013.01); *B29K 2019/00* (2013.01); *B29K 2105/0058* (2013.01); *B29K 2105/0094* (2013.01); *B29K 2105/24* (2013.01); *B29K 2509/08* (2013.01); *B33Y 10/00* (2014.12)

(58) Field of Classification Search
CPC ... B29C 64/106; B29C 67/00; B29K 2019/00; B29K 2105/0058; B29K 2105/0094; B29K 2105/24; B29K 2509/08
USPC .......................................... 524/571
See application file for complete search history.

(56) References Cited

U.S. PATENT DOCUMENTS

| | | |
|---|---|---|
| 2007/0043138 A1 | 2/2007 | Yamamura et al. |
| 2008/0097039 A1 | 4/2008 | Ito et al. |
| 2008/0314495 A1 | 12/2008 | Uesaka et al. |
| 2010/0076107 A1 | 3/2010 | Kitano et al. |
| 2013/0319735 A1* | 12/2013 | Inoue ............... H05K 1/0271 174/255 |
| 2015/0224226 A1 | 8/2015 | Bhatia et al. |

FOREIGN PATENT DOCUMENTS

| | | |
|---|---|---|
| EP | 1 734 066 A1 | 12/2006 |
| EP | 2 006 121 A1 | 12/2008 |
| JP | 2000-44730 A | 2/2000 |
| JP | 2006-111750 A | 4/2006 |
| JP | 2009-62484 A | 3/2009 |
| JP | 2011-143615 A | 7/2011 |
| JP | 2014-34621 A | 2/2014 |
| JP | 2014-109023 A | 6/2014 |
| JP | 2015-168135 A | 9/2015 |
| JP | 2015-529523 A | 10/2015 |
| WO | WO 2014/194155 A1 | 12/2014 |
| WO | WO 2016/012796 A1 | 1/2016 |

OTHER PUBLICATIONS

International Search Report, issued in PCT/JP2017/000649, dated Feb. 7, 2017.
Written Opinion of the International Searching Authority, issued in PCT/JP2017/000649, dated Feb. 7, 2017.
Chinese Office Action issued in Application No. 201780014084.6 dated Mar. 4, 2021.

* cited by examiner

RUBBER COMPOSITION FOR ADDITIVE MANUFACTURING

The present application is a national stage filing under 35 U.S.C. § 371 of PCT application number PCT/JP2017/000649 filed on Jan. 11, 2017, which claims priority to Japanese Patent Application Nos. 2016-042996 filed on Mar. 7, 2016 in the Japanese Patent Office. The disclosures of the above-listed applications are hereby incorporated by reference herein in their entireties.

TECHNICAL FIELD

The present invention relates to a rubber composition for additive manufacturing, a rubber shaped article obtained by curing the composition, and a method for producing a rubber shaped article using the composition.

BACKGROUND ART

In recent years, additive manufacturing apparatuses (so-called 3D printers) for producing three-dimensional structures by depositing and curing layers of resin on the basis of the design data of the three-dimensional structures have been put to practical use. Many methods are known for such additive manufacturing apparatuses, including an ink-jet method, a method in which photocurable resins are cured by laser beam irradiation, and a method in which layers of melted ABS resins or the like are deposited.

For example, the ink-jet method produces a three-dimensional structure by discharging microdroplets of a photocurable liquid resin composition from a nozzle to draw a pattern with a predetermined shape, irradiating the pattern with UV light to form a cured thin film, and repeatedly depositing such films. Moreover, for example, fused deposition modeling produces a three-dimensional structure by melting a solid ABS resin or the like by heating, dropping the melted resin from a nozzle to draw a pattern with a predetermined shape, cooling the resin to reduce the flowability, and repeating this process to deposit layers of the resin.

CITATION LIST

Patent Literature

Patent Literature 1: JP 2015-168135 A

SUMMARY OF INVENTION

Technical Problem

Three-dimensional structures produced using additive manufacturing apparatuses that are made of resins are generally known. On the other hand, rubber has low temperature dependence in terms of elastic modulus compared to resins, and has a low compression set; therefore, if three-dimensional structures made of rubber (rubber shaped articles) can be produced, these structures are expected to be used for applications different from three-dimensional structures made of resins or metals.

Under such circumstances, a main object of the present invention is to provide a rubber composition for additive manufacturing that allows rubber shaped articles to be favorably produced using an additive manufacturing apparatus. Another object of the present invention is to provide a rubber shaped article obtained by curing the rubber composition for additive manufacturing, and a method for producing a rubber shaped article using the composition.

Solution to Problem

The inventors of the present invention conducted extensive research to solve the aforementioned problem. As a result, they found that rubber shaped articles are favorably obtained by applying a rubber composition for additive manufacturing comprising a liquid rubber to an additive manufacturing method. The present invention was completed as a result of further research based on these findings.

In summary, the present invention provides aspects of invention as itemized below.

Item 1. A rubber composition for additive manufacturing comprising a liquid rubber.

Item 2. The rubber composition for additive manufacturing according to item 1, further comprising a co-crosslinking agent.

Item 3. The rubber composition for additive manufacturing according to item 1 or 2, further comprising a vulcanized rubber.

Item 4. The rubber composition for additive manufacturing according to any one of items 1 to 3, further comprising a filler.

Item 5. The rubber composition for additive manufacturing according to any one of items 1 to 4, further comprising a polyrotaxane that can form a chemical bond with the liquid rubber.

Item 6. The rubber composition for additive manufacturing according to any one of items 1 to 5, wherein a content of the liquid rubber is 40 mass % or more.

Item 7. The rubber composition for additive manufacturing according to any one of items 1 to 6, which has a viscosity of 1500 Pa·s or less, as measured using an E-type viscometer at an amplitude of 1% and a frequency of 1 Hz, under an environment at a temperature of 60° C. and a relative humidity of 50%.

Item 8. A rubber shaped article, which is a cured product of the rubber composition for additive manufacturing according to any one of items 1 to 7.

Item 9. A rubber shaped article, which is a cured product of the rubber composition for additive manufacturing according to item 5, wherein the liquid rubber and the polyrotaxane form a chemical bond in the cured product.

Item 10. The rubber shaped article according to item 8 or 9, which has a Shore A hardness within a range of 25 to 90.

Item 11. The rubber shaped article according to any one of items 8 to 10, which has a tensile strength at break of 0.7 MPa or more.

Item 12. The rubber shaped article according to any one of items 8 to 11, which has an elongation at break of 50% or more.

Item 13. The rubber shaped article according to any one of items 8 to 12, which has a compression set (24 hours) of 10% or less.

Item 14. A method for producing a rubber shaped article comprising:

a layer deposition step of depositing layers of the rubber composition for additive manufacturing according to any one of items 1 to 7; and a curing step of curing the deposited layers of the rubber composition for additive manufacturing.

Advantageous Effects of Invention

The present invention can provide a rubber composition for additive manufacturing that allows rubber shaped articles to be favorably produced using an additive manufacturing apparatus. The present invention can also provide a rubber shaped article obtained by curing the rubber composition for additive manufacturing, and a method for producing a rubber shaped article using the composition.

BRIEF DESCRIPTION OF DRAWINGS

FIGS. 1(a) and (b) are a perspective view and a plan view, respectively, each showing an example of a rubber shaped article.

FIGS. 2(a) and (b) are a perspective view and a side view, respectively, each showing an example of a rubber shaped article.

DESCRIPTION OF EMBODIMENTS

A rubber composition for additive manufacturing of the present invention comprises a liquid rubber. Specifically, in the present invention, a rubber composition comprising a liquid rubber is used as a raw material used for an additive manufacturing method, which allows rubber shaped articles to be favorably produced using an additive manufacturing apparatus. The following provides a detailed description of the rubber composition for additive manufacturing of the present invention, a rubber shaped article obtained by curing the composition, and a method for producing a rubber shaped article using the composition.

As used herein, the term "rubber composition for additive manufacturing" refers to a rubber composition that is used for an additive manufacturing apparatus (a so-called 3D printer or the like) for producing a three-dimensional structure by depositing and curing layers of the rubber composition on the basis of the design data of the three-dimensional structure, for example. Many methods are known for such additive manufacturing apparatuses, including an inkjet method, a method in which photocurable resins are cured by laser beam irradiation, and a method in which layers of melted ABS resins or the like are deposited. A desired rubber shaped article is obtained by repeatedly depositing layers of the rubber composition of the present invention, and curing the rubber composition.

<Rubber Composition for Additive Manufacturing>

The rubber composition for additive manufacturing of the present invention comprises a liquid rubber. The liquid rubber is not particularly limited, and any known liquid rubbers may be used. Specific examples of liquid rubbers include liquid butadiene rubber, liquid styrene-butadiene copolymer rubber, liquid isoprene-butadiene copolymer rubber, liquid isoprene rubber, liquid hydrogenated isoprene rubber, and liquid isoprene-styrene copolymer rubber. Among the above, from the viewpoint of imparting excellent rubber characteristics (for example, the below-described Shore hardness, elongation at break, tensile strength at break, and compression set) to a rubber shaped article obtained by curing the rubber composition, while having an appropriate viscosity for additive manufacturing, preferred are a liquid rubber having an unsaturated bond such as a (meth)acryloyl group or a vinyl group that is crosslinked by heat, light, electron beam, or the like, and a liquid rubber having a cyclic ether such as an epoxy compound or an oxetane compound; in particular, a liquid rubber having a (meth)acryloyl group is preferred. These liquid rubbers may be used alone, or in combination of two or more. As used herein, the term "(meth)acryloyl group" refers to "an acryloyl group or a methacryloyl group". The same applies to similar expressions.

While the content of the liquid rubber in the rubber composition for additive manufacturing of the present invention is not particularly limited, it is preferably 40 mass % or more, more preferably about 45 to 90 mass %, and still more preferably about 50 to 70 mass %, for example, from the viewpoint of imparting excellent rubber characteristics to a rubber shaped article obtained by curing the rubber composition, while having an appropriate viscosity for additive manufacturing.

While the number average molecular weight (Mn) of the liquid rubber is not particularly limited, it is preferably 500 or more, more preferably about 5000 to 60000, and still more preferably about 5000 to 40000, for example, from the same viewpoint as described above.

The number average molecular weight (Mn) of the liquid rubber is a value measured using a gel permeation chromatograph relative to polystyrene standards.

The rubber composition for additive manufacturing of the present invention may further comprise a co-crosslinking agent, from the viewpoint of imparting excellent rubber characteristics to a rubber shaped article obtained by curing the rubber composition, while having an appropriate viscosity for additive manufacturing. Any known co-crosslinking agents such as photoreactive resins may be used as the co-crosslinking agent. Specific examples of co-crosslinking agents include zinc acrylate, magnesium acrylate, zinc methacrylate, and magnesium methacrylate; and those having an unsaturated bond such as styrene monomers, (meth)acrylate monomers, and (meth)acrylamide monomers, as well as oligomers thereof. These co-crosslinking agents may be used alone, or in combination of two or more.

While the content of the co-crosslinking agent in the rubber composition for additive manufacturing of the present invention is not particularly limited, it is preferably 1 mass % or more, more preferably about 5 to 50 mass %, still more preferably about 10 to 50 mass %, and particularly preferably about 10 to 30 mass %, for example, from the viewpoint of imparting excellent rubber characteristics to a rubber shaped article obtained by curing the rubber composition, while having an appropriate viscosity for additive manufacturing.

The rubber composition for additive manufacturing of the present invention may further comprise a vulcanized rubber, from the viewpoint of imparting excellent rubber characteristics to a rubber shaped article obtained by curing the rubber composition, while having an appropriate viscosity for additive manufacturing. The vulcanized rubber is not particularly limited, and any known vulcanized rubbers obtained by vulcanizing natural rubbers or synthetic rubbers may be used. Examples of rubber components constituting the vulcanized rubber include natural rubbers, isoprene rubber, butadiene rubber, styrene-butadiene rubber, butyl rubber, ethylene propylene diene rubber, ethylene propylene rubber, chloroprene rubber, acrylonitrile-butadiene rubber, chlorosulfonated polyethylene, epichlorohydrin rubber, chlorinated polyethylene, silicone rubber, fluororubber, and urethane rubber. Among the above, a vulcanized rubber obtained by vulcanizing a natural rubber is preferred, from the viewpoint of imparting excellent rubber characteristics to a rubber shaped article obtained by curing the rubber composition, while having an appropriate viscosity for additive manufacturing. These vulcanized rubbers may be used alone, or in combination of two or more.

The vulcanized rubber is preferably in the form of particles, from the viewpoint of imparting excellent rubber characteristics to a rubber shaped article obtained by curing the rubber composition, while having an appropriate viscosity for additive manufacturing. While the particle diameter of the vulcanized rubber is not particularly limited, the median particle diameter is preferably about 200 μm or less, more preferably about 100 μm or less, and still more preferably about 50 μm or less, from the same viewpoint as described above.

As used herein, the median particle diameter of the vulcanized rubber refers to the median diameter (cumulative 50% of the particle diameter) measured with a laser diffraction/scattering-type particle size measurement apparatus.

While the content of the vulcanized rubber in the rubber composition for additive manufacturing of the present invention is not particularly limited, it is preferably 10 mass % or more, more preferably about 20 to 80 mass %, and still more preferably about 30 to 50 mass %, for example, from the viewpoint of imparting excellent rubber characteristics to a rubber shaped article obtained by curing the rubber composition, while having an appropriate viscosity for additive manufacturing.

The rubber composition for additive manufacturing of the present invention preferably comprises a radical initiator. The inclusion of a radical initiator allows curing of the above-described liquid rubber to be accelerated. The radical initiator is not particularly limited, and any known radical initiators that generate radicals upon heating, light irradiation, electron beam irradiation, or the like may be used. Examples of preferred radical initiators include acetophenone, 4,4'-dimethoxybenzyl, dibenzoyl, 2-hydroxy-2-phenylacetophenone, benzophenone, benzophenone-2-carboxylic acid, benzophenone-4-carboxylic acid, benzophenone-2-carboxylic acid methyl ester, N,N,N',N'-tetraethyl-4,4'-diaminobenzophenone, 2-methoxy-2-phenylacetophenone, 2-isopropoxy-2-phenylacetophenone, 2-isobutoxy-2-phenylacetophenone, 2-ethoxy-2-phenylacetophenone, 2,2'-bis(2-chlorophenyl)-4,4',5,5'-tetraphenyl-1,2'-biimidazole, 2-(1,3-benzodioxol-5-yl)-4,6-bis(trichloromethyl)-1,3,5-triazine, 2-benzyl-2-(dimethylamino)-1-[4-(morpholino)phenyl]-1-butanone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl) phosphine oxide, phenylbis(2,4,6-trimethylbenzoyl) phosphine oxide, 1,4-dibenzoylbenzene, 2-ethyl anthraquinone, 1-hydroxycyclohexyl phenyl ketone, 2-hydroxy-2-methylpropiophenone, 2-hydroxy-4'-(2-hydroxyethoxy)-2-methylpropiophenone, 2-methyl-4'-(methylthio)-2-morpholinopropiophenone, 2-isonitrosopropiophenone, 2-phenyl-2-(p-toluenesulfonyloxy)acetophenone, phenylglyoxylic acid methyl ester, 1,2-octanedione, 1-[4-(phenylthio)-, 2-(0-benzoyloxime)], and ethanone, 1-[9-ethyl-6-(2-methylbenzoyl)-9H-carbazol-3-yl]-, 1-(O-acetyloxime). These radical initiators may be used alone, or in combination of two or more.

The content of the radical initiator is preferably about 0.5 to 10 parts by mass, and more preferably about 1 to 7 parts by mass, for example, per 100 parts by mass of the liquid rubber.

The rubber composition for additive manufacturing of the present invention may further contain a filler. The inclusion of a filler allows the viscosity of the rubber composition for additive manufacturing or the rubber characteristics of a rubber shaped article obtained by curing the rubber composition to be adjusted.

Examples of fillers include, although not particularly limited to, carbon black, silica, calcium carbonate, clay, and talc. When silica is used as a filler, surface-unmodified silica may be used. Alternatively, when, for example, surface-modified silica whose surface is modified with a silane coupling agent or the like, or a mixture of silica and a silane coupling agent is used as a filler, the mechanical strength of a rubber shaped article obtained by curing the rubber composition can be further improved. These fillers may be used alone, or in combination of two or more.

Furthermore, when the rubber composition for additive manufacturing of the present invention comprises a filler, the composition may further comprise a silane coupling agent. In particular, when a surface-unmodified filler is used, the inclusion of a silane coupling agent allows the liquid rubber and the filler to be strongly bonded, thus allowing a rubber shaped article obtained by curing the rubber composition to be imparted with excellent rubber characteristics.

While the content of the filler is not particularly limited, it is preferably 5 mass % or more, more preferably about 5 to 70 mass %, and still more preferably about 10 to 50 mass %, for example, from the viewpoint of imparting excellent rubber characteristics to a rubber shaped article obtained by curing the rubber composition, while having an appropriate viscosity for additive manufacturing.

The rubber composition for additive manufacturing of the present invention may further comprise a polyrotaxane that can form a chemical bond with the liquid rubber, from the viewpoint of imparting excellent rubber characteristics to a rubber shaped article obtained by curing the rubber composition, while having an appropriate viscosity for additive manufacturing. A polyrotaxane has a structure wherein a polypseudorotaxane in which a linear molecule is threaded through the openings of cyclic molecules includes stoppers positioned on the ends thereof (ends of the linear molecule). Any known polyrotaxanes may be used.

Examples of linear molecules constituting the polyrotaxane include polycaprolactone, styrene-butadiene copolymer, isobutene-isoprene copolymer, polyisoprene, natural rubber (NR), polyethylene glycol, polyisobutylene, polybutadiene, polypropylene glycol, polytetrahydrofuran, polydimethylsiloxane, polyethylene, polypropylene, and ethylene-polypropylene copolymer.

The linear molecule may also be, for example, a copolymer of one or more aromatic vinyl compounds such as styrene, α-methylstyrene, 1-vinylnaphthalene, 3-vinyltoluene, ethylvinylbenzene, divinylbenzene, 4-cyclohexylstyrene, and 2,4,6-trimethylstyrene; a copolymer of one or more conjugated diene compounds such as 1,3-butadiene, isoprene, 1,3-pentadiene, 2,3-dimethylbutadiene, 2-phenyl-1,3-butadiene, and 1,3-hexadiene; or a copolymer of any of the above-mentioned aromatic vinyl compounds and conjugated diene compounds.

These linear molecules may be used alone, or in combination of two or more. The linear molecule preferably has a weight average molecular weight of about 10000 or more and 1000000 or less. Examples of stoppers that cap the ends of the linear molecule include one or more of a dinitrophenyl group, an adamantyl group, a trityl group, fluorescein, pyrene, and derivatives thereof.

Examples of cyclic molecules include one or more of cyclodextrins, crown ethers, benzo-crown ethers, dibenzo-crown ethers, dicyclohexano-crown ethers, and derivatives thereof. Particularly preferred as cyclic molecules are one or more of α-, β-, and γ-cyclodextrins, as well as derivatives thereof.

In the present invention, the polyrotaxane can form a chemical bond with the liquid rubber. More specifically, the polyrotaxane has a functional group that can form a chemical bond with the liquid rubber. The functional group is preferably present in a side chain of the cyclic molecules.

While the functional group in the polyrotaxane that can form a chemical bond with the liquid rubber is not particularly limited, the functional group is preferably an unsaturated bond such as a (meth)acryloyl group or a vinyl group that is crosslinked by heat, light, electron beam, or the like, and is particularly preferably a (meth)acryloyl group. When the liquid rubber has an unsaturated bond that is crosslinked by heat, light, electron beam, or the like as described above, the unsaturated bond of the liquid rubber can form a chemical bond with the functional group in the polyrotaxane.

Commercially available polyrotaxanes may also be used as the polyrotaxane. Examples of commercially available UV-curable polyrotaxanes include SeRM (registered trademark) Super Polymer SM3403P, SA3403P, SA2403P, SM1313P, and SA1313P from Advanced Softmaterials Inc. All these products are supplied as 50 mass % MEK solutions, and products such as SM3405P, SA3405P, and SA2405P are all supplied as 70 mass % ethyl acetate solutions. Moreover, UV-curable polyrotaxanes blended with reactive diluents such as an acrylic oligomer are also supplied. Examples of such products include SeRM (registered trademark) Key-Mixture SM3400C, SA3400C, and SA2400C from Advanced Softmaterials Inc.

These polyrotaxanes may be used alone, or in combination of two or more.

While the content of the polyrotaxane in the rubber composition for additive manufacturing of the present invention is not particularly limited, it is preferably about 1 mass % or more, more preferably about 1 to 20 mass %, still more preferably about 2 to 10 mass %, and particularly preferably about 3 to 10 mass %, for example, from the viewpoint of imparting excellent rubber characteristics to a rubber shaped article obtained by curing the rubber composition, while having an appropriate viscosity for additive manufacturing.

The rubber composition for additive manufacturing of the present invention may further comprise various additives without impairing the effects of the present invention. Examples of additives include, although not particularly limited to, polymers, dyes, pigments, leveling gents, rheology modifiers, defoaming agents, plasticizers, polymerization inhibitors, flame retardants, dispersion stabilizers, storage stabilizers, antioxidants, metals, metal oxides, metal salts, and ceramics. The rubber composition may contain one, or two or more of these additives.

While the viscosity of the rubber composition for additive manufacturing of the present invention is not particularly limited, so long as the viscosity allows a pattern to be drawn and layers to be deposited using an additive manufacturing apparatus, the viscosity of the rubber composition as measured using an E-type viscometer under an environment at a temperature of 60° C. (error within ±2° C.) and a relative humidity of 50% is preferably 1500 Pa·s or less, more preferably about 0.1 to 1500 Pa·s, and still more preferably about 1 to 1000 Pa·s, for example, from the viewpoint of having an appropriate viscosity for additive manufacturing, and imparting excellent rubber characteristics to a rubber shaped article obtained by curing the composition. More specifically, this viscosity is measured using an E-type viscometer (MCR301 from Anton-Paar) at an amplitude of 1% and a frequency of 1 Hz.

The rubber composition for additive manufacturing of the present invention can be readily produced by mixing the liquid rubber and optional components such as a co-crosslinking agent, a vulcanized rubber, an initiator, a filler, a polyrotaxane, and various additives.

<Rubber Shaped Article>

The rubber shaped article of the present invention is a cured product of the above-described rubber composition for additive manufacturing. Specifically, the rubber shaped article of the present invention is a product obtained by curing the rubber composition for additive manufacturing by heating, light irradiation, electron beam irradiation, or the like.

When the above-described rubber composition for additive manufacturing comprising a polyrotaxane that can form a chemical bond with a liquid rubber is used to produce the rubber shaped article of the present invention, the liquid rubber and the polyrotaxane form a chemical bond in the cured product constituting the rubber shaped article of the present invention.

While the Shore A hardness of the rubber shaped article of the present invention may be adjusted as appropriate in accordance with the hardness required in the product, it is preferably in the range of 25 to 90, for example, from the viewpoint of imparting excellent rubber characteristics. Moreover, while the Shore C hardness of the rubber shaped article of the present invention may be adjusted as appropriate in accordance with the hardness required in the product, it is preferably in the range of 45 to 90, for example, from the viewpoint of imparting excellent rubber characteristics. As used herein, the Shore A hardness and Shore C hardness of the rubber shaped article are values measured in accordance with the methods defined in JIS K6253 and JIS K7312, respectively.

While the elongation at break of the rubber shaped article of the present invention may be adjusted as appropriate in accordance with the elongation at break required in the product, it is preferably 50% or more, and more preferably 90% or more, for example, from the viewpoint of imparting excellent rubber characteristics. The upper limit of the elongation at break is typically about 500%. As used herein, the elongation of the rubber shaped article is a value measured in accordance with the method defined in JIS K6251.

While the tensile strength at break of the rubber shaped article of the present invention may be adjusted as appropriate in accordance with the tensile strength at break required in the product, it is preferably 0.7 MPa or more, for example, from the viewpoint of imparting excellent rubber characteristics. The upper limit of the tensile strength at break is typically about 30 MPa. As used herein, the tensile strength at break of the rubber shaped article is a value measured in accordance with the method defined in JIS K6251.

While the compression set (after 24 hours) of the rubber shaped article of the present invention may be adjusted as appropriate in accordance with the compression set required in the product, it is preferably in the range of 10% or less, and more preferably 7% or less, for example, from the viewpoint of imparting excellent rubber characteristics. Moreover, while the compression set (after 0.5 hour) of the rubber shaped article of the present invention may be adjusted as appropriate in accordance with the compression set required in the product, it is preferably in the range of 20% or less, and more preferably 15% or less, for example, from the viewpoint of imparting excellent rubber characteristics. As used herein, the compression set of the rubber shaped article is a value measured in accordance with the method defined in JIS K6262.

While the density of the rubber shaped article of the present invention may be adjusted as appropriate in accordance with the density required in the product, it is preferably about 0.8 to 2.2 g/cm³, for example, from the viewpoint of imparting excellent rubber characteristics.

Figure 1:
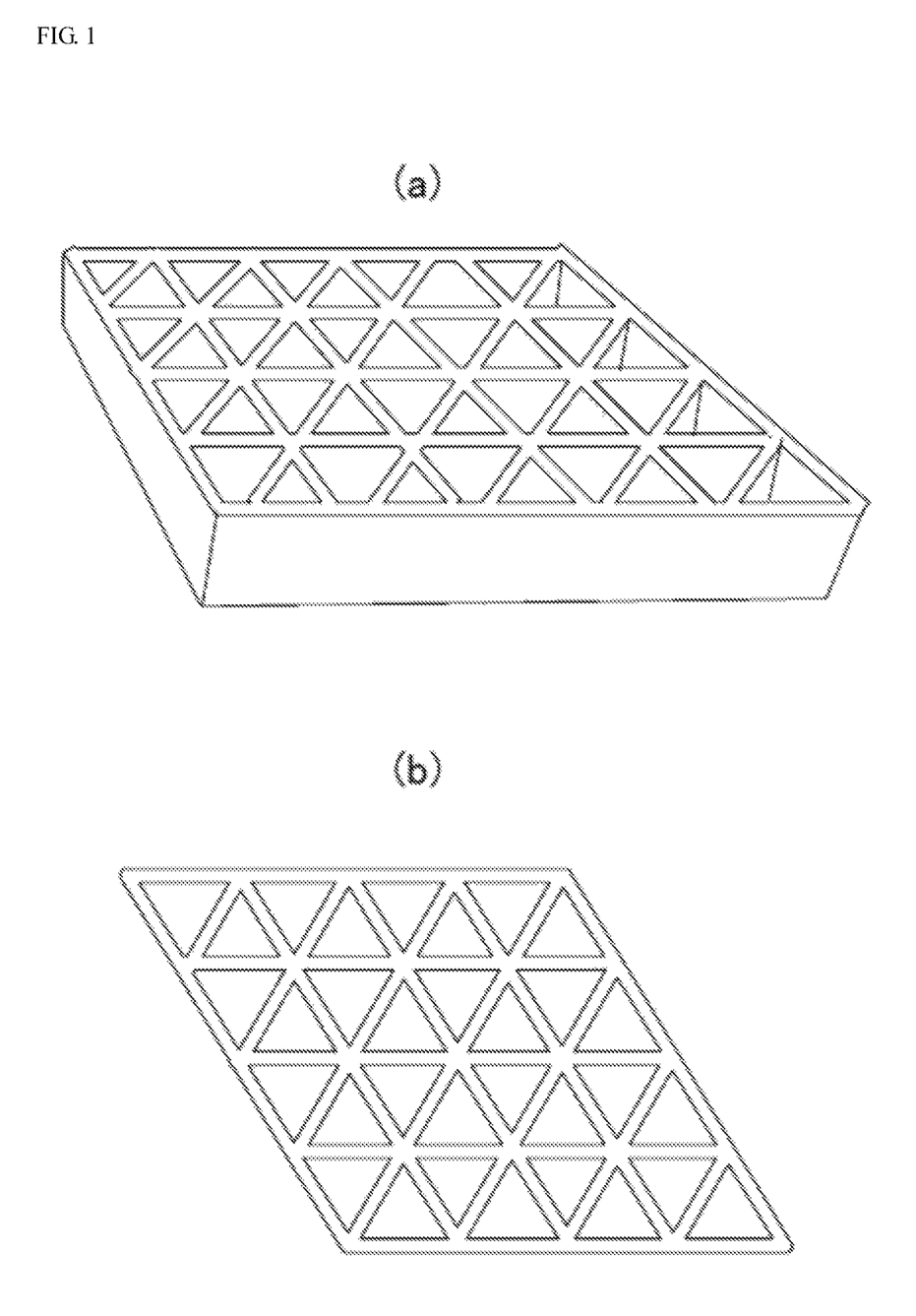
Figure 2:
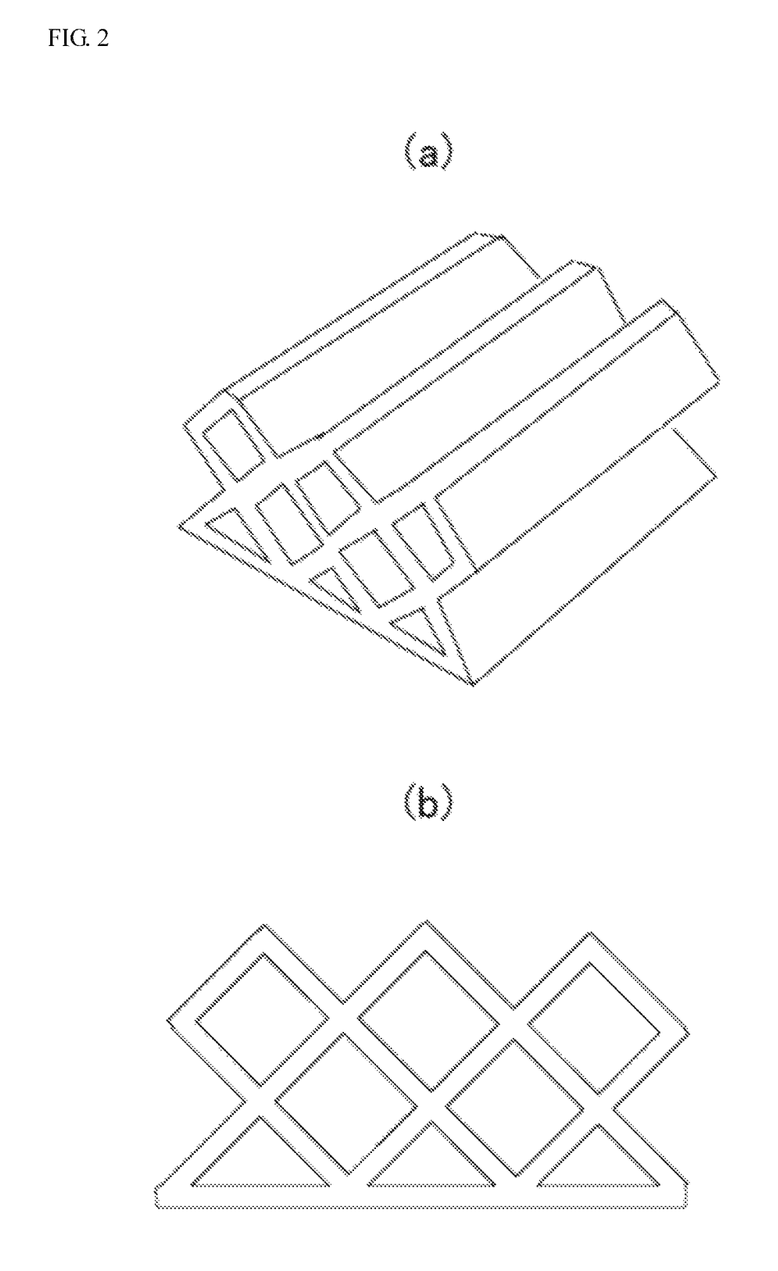

The shape of the rubber shaped article of the present invention is not particularly limited, and may be any desired shape produced using an additive manufacturing method. For example, a three-dimensional shape may be obtained by forming a layer that is two-dimensionally grid-shaped as shown in FIG. 1, and depositing these layers. In this manner, layers with the same shape may be deposited to produce a rubber shaped article; alternatively, layers with different two-dimensional shapes may be deposited to produce a rubber shaped article. For example, as shown in FIG. 2, a rubber shaped article that is grid-shaped as viewed from the side may also be produced. In this case, the rubber composition is viscous, and, for example, each time one layer is formed, the layer is cured by UV light or other light, or an electron beam; therefore, even if layers of the rubber composition are deposited in a direction inclined with respect to the vertical direction, rather than the vertical direction, the layers of the rubber composition can be deposited without collapsing. The shape of the rubber shaped article is not particularly limited, and instead of being a grid shape, it may be a hollow or solid three-dimensional shape with any of various shapes.

The method for producing the rubber shaped article of the present invention is not particularly limited, and the rubber shaped article may be produced in accordance with a known additive manufacturing method, using the above-described rubber composition for additive manufacturing as a raw material. The details of the method for producing the rubber shaped article of the present invention are as described in <Method for Producing Rubber Shaped Article> below.

<Method for Producing Rubber Shaped Article>

The method for producing the rubber shaped article of the present invention may employ a conventionally known additive manufacturing method that uses a liquid resin as a raw material, by using the above-described rubber composition for additive manufacturing. Specifically, by using the rubber composition for additive manufacturing of the present invention as a raw material, instead of a liquid resin, the rubber shaped article can be produced using any of various additive manufacturing methods, such as an ink-jet method, a method in which raw materials are cured by laser beam irradiation, and a method in which layers of melted raw materials are deposited.

The rubber shaped article of the present invention can be favorably produced using, for example, a method comprising a layer deposition step of depositing layers of the above-described rubber composition for additive manufacturing; and a curing step of curing the deposited layers of the rubber composition for additive manufacturing.

More specifically, for example, when an ink-jet method is adopted, microdroplets of the above-described rubber composition for additive manufacturing are discharged from a nozzle to draw a pattern with a predetermined shape to form a thin film of the rubber composition, and then the thin film is cured by heating, light irradiation, or electron beam irradiation. A thin film of the rubber composition is similarly formed on the cured thin film, and then the thin film is cured. This process is repeated to deposit cured thin films of the rubber composition. As a result, a rubber shaped article (three-dimensional structure) can be produced.

Moreover, for example, when fused deposition modeling is adopted, the viscosity of the rubber composition for additive manufacturing is reduced by heating, and the rubber composition is dropped from a nozzle, so as to be discharged to draw a pattern with a predetermined shape to form a thin film of the rubber composition, and then the thin film is cured by heating, light irradiation, or electron beam irradiation. A thin film of the rubber composition having a reduced viscosity is similarly formed on the cured thin film, and then the thin film is cured. This process is repeated to deposit cured thin films of the rubber composition. As a result, a rubber shaped article (three-dimensional structure) can be produced. In this case, at least one of the table and nozzle for depositing layers of the rubber composition may be moved two-dimensionally or three-dimensionally to deposit layers of the rubber composition in a desired shape.

When the rubber composition for additive manufacturing is cured by heating, the heating temperature is preferably about 80 to 170° C., and more preferably about 100 to 160° C., although not particularly limited thereto. The heating time is preferably about 1 to 60 minutes, and more preferably about 5 to 30 minutes, for example. When, for example, the rubber composition for additive manufacturing is cured by light irradiation, it is preferably cured by UV irradiation at a wavelength of about 365 nm, a UV intensity of about 1 mW/cm² to 10 W/cm², and a cumulative dose of about 1 mJ/cm² to 100 J/cm². UV light may be emitted each time one layer of the rubber composition is formed, or may be emitted each time a plurality of layers are formed. Alternatively, the nozzle may be equipped with a UV irradiation device, and UV light may be emitted while the rubber composition is being discharged from the nozzle. The same also applies to irradiation of light other than UV light.

When thin films of the rubber composition are formed by discharging the rubber composition for additive manufacturing from a nozzle, the thickness of one of the thin films is preferably about 0.001 to 1 mm, and more preferably about 0.01 to 0.5 mm, for example. Moreover, the diameter of the nozzle for discharging the rubber composition for additive manufacturing of the present invention is preferably about 0.001 to 1 mm, and more preferably about 0.01 to 0.5 mm, for example, although it may vary depending on the method or apparatus of additive manufacturing. The rubber composition for additive manufacturing of the present invention, which has an appropriate viscosity for additive manufacturing, is suitably used as a rubber composition to be discharged from a nozzle having such a diameter.

EXAMPLES

Examples of the present invention will be hereinafter described, although the present invention is not limited to the following examples.

Examples 1 to 15

(Production of Rubber Compositions)

Rubber compositions were each prepared by mixing a liquid rubber, a radical initiator, a co-crosslinking agent, a vulcanized rubber, a filler, and a silane coupling agent in the proportions (parts by mass) shown in Table 1. Each of the rubber compositions was produced by homogeneously mixing the components. The details of each of the components are as set forth below. In Table 1, "-" means not measured, and the blank fields mean that no components were added.

Liquid rubber: UC203 (liquid isoprene rubber from Kuraray Co., Ltd., number average molecular weight: 35000)

Co-crosslinking agent: BEAMSET 505A-6 (oligomer from Arakawa Chemical Industries, Ltd.)

Vulcanized rubbers: ground vulcanized rubbers "VR-1 to VR-8" having the compositions (mass ratios) shown in Table 2 below were used. The median particle diameters D (50) of "VR-1 to VR-8" were as set forth below. While VR-2 and VR-3 have the same composition, they differ in grade in that VR-2 has a ground particle diameter of 412 μm or less, and VR-3 has a ground particle diameter of 128 μm or less. In Table 1, the blank fields mean that no components were added.

VR-1: D (50)=86
VR-2: D (50)=103
VR-3: D (50)=45
VR-4: D (50)=80
VR-5: D (50)=106
VR-6: D (50)=107
VR-7: D (50)=104
VR-8: D (50)=75

Fillers: Nipsil VN3 is surface-untreated silica particles (nitrogen adsorption specific surface area (BET method): about 180 to 230 m²/g, from Tosoh Corporation). CRS EMIX-300 is silica particles surface-treated with a silane coupling agent (nitrogen adsorption specific surface area (BET method): about 25 to 35 m²/g, from Tatsumori Ltd.).

Silane coupling agent: Y9936 from Momentive Performance Materials Japan LLC (Measurement of Viscosities of Rubber Compositions)

The viscosity of the rubber composition obtained in each of the examples was measured. The results are shown in Table 1. The viscosity was measured using an E-type viscometer (MCR301 from Anton-Paar) at an amplitude of 1% and a frequency of 1 Hz, under an environment at a temperature of 60° C. (±2° C.) and a relative humidity of 50%.

(Production of Rubber Shaped Articles)

Using the rubber composition obtained in each of the examples, a rubber shaped article having a truss structure as shown in FIG. 2(a) was produced by repeating the formation of one layer of the rubber composition and UV curing. Specifically, each time one layer (the thickness of one layer: 0.4 mm) of the rubber composition was formed by discharging the rubber composition heated to 60° C. from a nozzle (nozzle size: inner diameter: 0.25 μm), the layer was irradiated with UV light to cure the rubber composition. The UV light wavelength was 365 nm, the UV light intensity was 14 mW/cm², and the UV light irradiation time was 60 sec/layer.

(Slab Hardnesses of Rubber Shaped Articles)

For the rubber shaped article obtained in each of the examples, the Shore A hardness and the Shore C hardness were measured under the following measurement conditions, in accordance with the method defined in JIS K6253 and the method defined in JIS K7312, respectively. The results are shown in Table 1.

(Elongation at Break)

For the rubber shaped article obtained in each of the examples, the elongation at break was measured under the following measurement conditions, in accordance with the method defined in JIS K6251. The results are shown in Table 1.

(Tensile Strength at Break)

For the rubber shaped article obtained in each of the examples, the tensile strength at break was measured under the following measurement conditions, in accordance with the method defined in JIS K6251. The results are shown in Table 1.

(Compression Set)

For the rubber shaped article obtained in each of the examples, the compression set after 0.5 hour and the compression set after 24 hours were each measured under the following measurement conditions, in accordance with the method defined in JIS K6262. The results are shown in Table 1.

(Density)

The density (g/cm³) of the rubber shaped article obtained in each of the examples was calculated based on the weight and the volume. The results are shown in Table 1.

TABLE 1

| | | Example 1 | Example 2 | Example 3 | Example 4 | Example 5 | Example 6 | Example 7 | Example 8 |
|---|---|---|---|---|---|---|---|---|---|
| Liquid Rubber | UC203 | 100 | 100 | 100 | 100 | 100 | 100 | 100 | 100 |
| Radical Polymerization Initiator | Irgacure 1173 | 3.3 | 3.3 | 3.3 | 3.0 | 3.0 | 3.0 | 3.0 | 3.0 |
| Co-Crosslinking Agent | BEAMSET 505A-6 | | | | 10 | 30 | 50 | 80 | 50 |
| Vulcanized Rubber | VR-1 | 50 | | | | | | | |
| | VR-2 | | 50 | | | | | | |
| | VR-3 | | | 50 | | | | | |
| | VR-4 | | | | | | | | 50 |
| | VR-5 | | | | | | | | |
| | VR-6 | | | | | | | | |
| | VR-7 | | | | | | | | |
| | VR-8 | | | | | | | | |
| Filler | Nipsil VN3 | | | | | | | | |
| | CRS EMIX-300 | | | | | | | | |
| Silane Coupling Agent | Y9936 | | | | | | | | |
| Viscosity of Rubber Composition [Pa·s @ 60 ± 2° C.] | | 171 | 134 | 144 | — | 29 | 28 | 31 | — |
| Physical Properties of Rubber Shaped Article | Slab Hardness Shore A | 28 | 36 | 37 | 32 | 40 | 42 | 58 | 54 |
| | Shore C | 52 | 58 | 58 | 54 | 61 | 56 | 71 | 71 |
| | Elongation at Break % | 174 | 122 | 163 | 128 | 115 | 143 | 111 | 135 |
| | Tensile Strength at Break MPa | 1.0 | 1.1 | 1.6 | 1.3 | 2.3 | 7.3 | 7.1 | 5.7 |
| | Compression Set % (after 0.5 hr) | 1.4 | 2.5 | 2.1 | 3.7 | 7.4 | 13.4 | 19.0 | 10.5 |
| | % (after 24 hr) | 0.3 | 1.7 | 1.6 | 3.1 | 1.0 | 3.5 | 6.2 | 2.1 |
| | Density g/cm³ | 0.94 | 0.96 | 0.95 | — | — | — | — | — |

TABLE 1-continued

|  |  | Example 9 | Example 10 | Example 11 | Example 12 | Example 13 | Example 14 | Example 15 |
|---|---|---|---|---|---|---|---|---|
| Liquid Rubber | UC203 | 100 | 100 | 100 | 100 | 100 | 100 | 100 |
| Radical Polymerization Initiator | Irgacure 1173 | 3.0 | 3.0 | 3.0 | 3.0 | 3.0 | 3.0 | 3.0 |
| Co-Crosslinking Agent | BEAMSET 505A-6 | 50 | 50 | 50 | 50 |  |  |  |
| Vulcanized Rubber | VR-1 |  |  |  |  |  |  |  |
|  | VR-2 |  |  |  |  |  |  |  |
|  | VR-3 |  |  |  |  |  |  |  |
|  | VR-4 |  |  |  |  |  |  |  |
|  | VR-5 | 50 |  |  |  |  |  |  |
|  | VR-6 |  | 50 |  |  |  |  |  |
|  | VR-7 |  |  | 50 |  |  |  |  |
|  | VR-8 |  |  |  | 50 |  |  |  |
| Filler | Nipsil VN3 |  |  |  |  | 10 | 30 |  |
|  | CRS EMIX-300 |  |  |  |  |  |  | 30 |
| Silane Coupling Agent | Y9936 |  |  |  |  | 0.7 | 2.1 |  |
| Viscosity of Rubber Composition [Pa·s @ 60 ± 2° C.] |  | — | — | — | — | 43 | 134 | 53 |
| Physical Properties of Rubber Shaped Article | Slab Hardness Shore A | 51 | 52 | 51 | 52 | 35 | 52 | 43 |
|  | Shore C | 72 | 66 | 67 | 68 | 57 | 67 | 60 |
|  | Elongation at Break % | 126 | 124 | 118 | 123 | 104 | 94 | 97 |
|  | Tensile Strength at Break MPa | 4.8 | 4.9 | 4.5 | 5.4 | 1.2 | 4.4 | 1.4 |
|  | Compression Set % (after 0.5 hr) | 13.2 | 13.0 | 12.0 | 10.9 | 0.3 | 2.0 | 3.4 |
|  | % (after 24 hr) | 1.8 | 1.9 | 2.7 | 2.1 | 0.1 | 1.7 | 3.5 |
|  | Density g/cm³ | — | — | — | — | — | — | — |

TABLE 2

|  |  | VR-1 | VR-2, VR-3 | VR-4 | VR-5 | VR-6 | VR-7 | VR-8 |
|---|---|---|---|---|---|---|---|---|
| Highstyrene SBR | JSR SBR 0202 | 100 | 100 |  |  |  |  |  |
| Natural Rubber | CV60 |  |  | 100 | 100 | 100 | 100 | 100 |
| Liquid Rubber | LIR-50 |  |  | 10 | 10 | 10 | 10 | 10 |
| Phenolic Antioxidant | SONGNOX 1076 | 0.5 | 0.5 |  |  |  |  |  |
|  | PEG400 | 0.5 | 0.5 |  |  |  |  |  |
| Silica | NIPSIL VN3 |  | 15 | 80 | 80 | 80 | 80 | 80 |
| Silane Coupling Agent | Si266 |  |  | 5.0 | 5.0 | 5.0 | 5.0 |  |
| Silylating Agent | KBE-3063 |  |  |  |  |  |  | 5.2 |
| Polymerization Initiator | PERCUMYL D | 1 | 2 | 1.0 | 2.0 | 3.0 | 3.0 | 3.0 |
| Photocurable Monomer | NK Ester TMPT | 1 | 1 |  |  |  |  |  |

The materials used in Table 2 are as set forth below:

Natural rubber: SMR (Standard Malaysian Rubber)-CV60, using JSR0202 from JSR Corporation as a base rubber.

Liquid rubber: LIR-50 from Kuraray Co., Ltd.

Antioxidant: SONGNOX 1076 from SONGWON

Silica: Nipsil VN3 from Tosoh Corporation

Silane coupling agent: Si266 from Momentive Performance Materials Japan LLC

Silylating agent: KBE-3063 from Shin-Etsu Chemical Co., Ltd.

Polymerization initiator: PERCUMYL D from NOF Corporation

Photocurable monomer: NK ester TMPT from Shin Nakamura Chemical Co., Ltd.

Examples 16 to 34

(Production of Rubber Compositions)

Rubber compositions were each prepared by mixing a liquid rubber, a radical initiator, a co-crosslinking agent, and a polyrotaxane in the proportions (parts by mass) shown in Table 3. Each of the rubber compositions was produced by homogeneously mixing the components. The liquid rubber, the radical initiator, and the co-crosslinking agent are the same as those used in Examples 1 to 15. The details of the polyrotaxane are as set forth below. In Table 3, "-" means not measured, and the blank fields mean that no components were added.

Polyrotaxanes: SeRM (registered trademark) Key-Mixture SA2400C and SeRM (registered trademark) Super Polymer SM1313P from Advanced Softmaterials Inc.

(Production of Rubber Shaped Articles)

Using the rubber composition obtained in each of Examples 16 to 34, a rubber shaped article having a truss structure as shown in FIG. 2(a) was produced by repeating the formation of one layer of the rubber composition and UV curing, as in Examples 1 to 15.

Moreover, the rubber shaped article obtained in each of Examples 16 to 34 was measured for slab hardness, elongation at break, tensile strength at break, and compression set, as in Examples 1 to 15. The results are shown in Table 3.

TABLE 3

|  |  | Example 16 | Example 17 | Example 18 | Example 19 | Example 20 | Example 21 | Example 22 | Example 23 | Example 24 | Example 25 |
|---|---|---|---|---|---|---|---|---|---|---|---|
| Liquid Rubber | UC203 | 100 | 100 | 100 | 100 | 100 | 100 | 100 | 100 | 100 | 100 |
| Radical Polymerization Initiator | Irgacure 1173 | 3.0 | 3.0 | 3.0 | 3.0 | 3.0 | 3.0 | 3.0 | 3.0 | 3.0 | 3.0 |
| Co-Crosslinking Agent | BEAMSET 505A-6 |  |  |  | 80.0 | 80.0 | 80.0 | 80.0 | 80.0 | 80.0 | 80.0 |
|  | IBXA |  | 5.0 |  |  |  | 3.0 | 5.0 | 5.0 | 5.0 | 5.0 |
| Polyrotaxane | SA2400C |  |  | 5.0 |  | 5.0 | 3.0 | 5.0 | 10.0 | 20.0 |  |
|  | SM1313P |  |  |  |  |  |  |  |  |  | 5.0 |
| Physical Properties of Rubber Shaped Article | Slab Hardness Shore A | 26 | 36 | 26 | 58 | 58 | 60 | 61 | 62 | 63 | 63 |
|  | Shore C | 50 | 58 | 51 | 71 | 71 | 71 | 73 | 73 | 75 | 73 |
|  | Elongation at Break % | 125 | 76 | 116 | 111 | 102 | 110 | 117 | 114 | 104 | 118 |
|  | Tensile Strength at Break MPa | 0.8 | 0.8 | 0.8 | 7.1 | 8.1 | 10.1 | 11.4 | 10.6 | 10.1 | 10.7 |
|  | Compression Set % (after 0.5 hr) | 1.4 | 1.2 | 0.7 | 19.0 | 23.9 | 15.1 | 16.9 | 17.5 | 19.4 | 15.9 |
|  | % (after 24 hr) | 0.7 | 0.5 | 0.3 | 6.2 | 9.3 | 6.4 | 7.5 | 6.8 | 5.9 | 7.5 |

|  |  | Example 26 | Example 27 | Example 28 | Example 29 | Example 30 | Example 31 | Example 32 | Example 33 | Example 34 |
|---|---|---|---|---|---|---|---|---|---|---|
| Liquid Rubber | UC203 | 100 | 100 | 100 | 100 | 100 | 100 | 100 | 100 | 100 |
| Radical Polymerization Initiator | Irgacure 1173 | 3.0 | 3.0 | 3.0 | 3.0 | 3.0 | 3.0 | 3.0 | 3.0 | 3.0 |
| Co-Crosslinking Agent | BEAMSET 505A-6 | 80.0 | 80.0 |  |  |  |  |  |  |  |
|  | IBXA |  |  |  |  |  |  | 5.0 | 20.0 | 50.0 |
| Polyrotaxane | SA2400C | 10.0 | 20.0 | 3.0 | 5.0 | 10.0 | 5.0 | 5.0 | 5.0 | 5.0 |
|  | SM1313P |  |  |  |  |  |  |  |  |  |
| Physical Properties of Rubber Shaped Article | Slab Hardness Shore A | 60 | 63 | 26 | 26 | 29 | 26 | 36 | 47 | 51 |
|  | Shore C | 72 | 74 | 50 | 51 | 53 | 51 | 59 | 66 | 67 |
|  | Elongation at Break % | 105 | 109 | 117 | 116 | 109 | 116 | 107 | 111 | 74 |
|  | Tensile Strength at Break MPa | 7.9 | 7.4 | 0.7 | 0.8 | 0.8 | 0.8 | 1.2 | 2.2 | 2.3 |
|  | Compression Set % (after 0.5 hr) | 21.5 | 21.3 | 0.3 | 0.7 | 0.4 | 0.7 | 0.3 | 1.6 | 4.5 |
|  | % (after 24 hr) | 7.5 | 5.8 | 1.4 | 0.3 | 0.9 | 0.3 | 0.5 | 1.2 | 2.7 |

The invention claimed is:

1. A rubber composition for additive manufacturing which comprises:
   a liquid rubber component which is a liquid rubber selected from one or more of a group comprising liquid butadiene rubber, liquid styrene-butadiene copolymer rubber, liquid isoprene-butadiene copolymer rubber, liquid isoprene rubber, liquid hydrogenated isoprene rubber, and liquid isoprene-styrene copolymer rubber, wherein the liquid rubber
   has a crosslinkable (meth)acryloyl group, vinyl group, epoxy group or oxetane group;
   has a number average molecular weight of 5,000 to 60,000, and
   is present in an amount of 40 to 90 mass % of the rubber composition; and
   a radical initiator that generates radicals upon light irradiation.

2. The rubber composition for additive manufacturing according to claim 1, further comprising at least one selected from the group consisting of zinc acrylate, magnesium acrylate, zinc methacrylate, magnesium methacrylate, styrene monomers, (meth)acrylate monomers, (meth)acrylamide monomers and oligomers thereof.

3. The rubber composition for additive manufacturing according to claim 1, further comprising a vulcanized rubber.

4. The rubber composition for additive manufacturing according to claim 1, further comprising a filler.

5. The rubber composition for additive manufacturing according to claim 1, further comprising a polyrotaxane that can form a chemical bond with the liquid rubber.

6. The rubber composition for additive manufacturing according to claim 1, wherein a content of the liquid rubber is 40 mass % or more.

7. The rubber composition for additive manufacturing according to claim 1, which has a viscosity of 1500 Pa·s or less, as measured using an E-type viscometer at an amplitude of 1% and a frequency of 1 Hz, under an environment at a temperature of 60° C. and a relative humidity of 50%.

8. A rubber shaped article, which is a cured product of the rubber composition for additive manufacturing according to claim 1.

9. A rubber shaped article, which is a cured product of the rubber composition for additive manufacturing according to claim 5, wherein the liquid rubber and the polyrotaxane form a chemical bond in the cured product.

10. The rubber shaped article according to claim 8, which has a Shore A hardness within a range of 25 to 90.

11. The rubber shaped article according to claim 8, which has a tensile strength at break of 0.7 MPa or more.

12. The rubber shaped article according to claim 8, which has an elongation at break of 50% or more.

13. The rubber shaped article according to claim 8, which has a compression set (24 hours) of 10% or less.

14. A method for producing a rubber shaped article comprising:
   a layer deposition step of depositing layers of the rubber composition for additive manufacturing according to claim 1; and
   a curing step of curing the deposited layers of the rubber composition for additive manufacturing.

15. The rubber composition for additive manufacturing according to claim 1, wherein the liquid rubber has the crosslinkable (meth)acryloyl group.

16. The rubber composition for additive manufacturing according to claim 1, wherein the content of at least one selected from the group consisting of zinc acrylate, magnesium acrylate, zinc methacrylate, magnesium methacrylate, styrene monomers, (meth)acrylate monomers, (meth)acrylamide monomers and oligomers thereof is about 10 to 50 mass %.

\* \* \* \* \*